United States Patent [19]
Bender

[11] 3,865,994
[45] Feb. 11, 1975

[54] COMBINATION TELEPHONE AND CALCULATOR

[76] Inventor: Bernard A. Bender, P.O. Box 361, Cherry Hill, N.J. 08002

[22] Filed: July 30, 1973

[21] Appl. No.: 383,915

[52] U.S. Cl. ............ 179/90 K, 179/2 DP, 235/156
[51] Int. Cl. ............ H04m 1/50
[58] Field of Search ......... 179/90 K, 90 AU, 90 BD, 179/90 B, 81 R, 84 R, 2 DP; 340/365 R; 235/145, 146, 156

[56] References Cited

UNITED STATES PATENTS 3,104,287 9/1963 Kobler ............ 179/90 BD
3,342,943 9/1967 Avmuller ............ 179/90 BD
3,387,098 6/1968 Fischer ............ 179/90 BB
3,573,376 4/1971 Bartlett ............ 179/2 DP
3,760,121 9/1973 Nissim ............ 179/90 K

*Primary Examiner*—Kathleen H. Claffy
*Assistant Examiner*—Thomas D'Amico
*Attorney, Agent, or Firm*—Charles F. Duffield

[57] ABSTRACT

Improvements are disclosed to a touch tone telephone which permits the touch tone keyboard of the telephone to serve the dual function as an input device to a calculator disposed within the telephone housing. The seven outputs from the touch tone keyboard are disengaged from the tone generators and applied as inputs to a decoding matrix which decodes the 12 buttons into their respective numeric representations and applies the 12 inputs as the inputs to a calculator.

2 Claims, 3 Drawing Figures

COMBINATION TELEPHONE AND CALCULATOR

BACKGROUND OF INVENTION

There is an ever increasing need in the business world for such electronic equipment as calculators, dictating machines, telephones, and the like. At present, each of these respective pieces of equipment are separate and apart one from another. The presence of each of the respective independent pieces of equipment on a businessman's desk provides a problem of crowding of the desk. A genuine need exists for some means to compact and combine one or more of these pieces of equipment.

There are in use today some special pieces of telephone equipment wherein the touch tone keyboard is used as an input for certain equipment. One such device utilizes the touch tone key board of the telephone to provide a sequence of touch tones representative of numbers of the keyboard as inputs to a remote computer which decodes the touch tones and provides return signals which are likewise decoded and represent stock quotations. Other variations of this device utilize the touch tone generators to send the tone signals across the telephone lines to remote computers where they are decoded. In all such devices, the keyboard of the telephone, when operating as the input to the remote computer, generates the touch tone signals which are transmitted across the telephone lines to a remote station at which they are decoded and utilized as inputs. None of these applications directly uses the contacts of the touch tone keyboard as the inputs to the calculating device separate from the tone generating functions of the keyboard.

OBJECTS AND SUMMARY OF INVENTION

It is the object of the present invention to provide improvements to touch tone type telephones wherein the keyboard of the telephone provides a direct input to a calculating device without utilizing the tone generators or decoding thereof.

The foregoing object of the present invention is carried out by means of a multiple contact double throw switch which disengages the seven outputs from the touch tone keyboard from the tone generators and applies the seven outputs to a decoding matrix. The decoding matrix which, in one embodiment,, includes twelve dual input nand gates decodes the seven outputs representative of the twelve buttons in the touch tone keyboard and provides at least ten of these outputs as the numeric inputs from zero to nine as the inputs to an electronic calculator.

Other objects and advantages of the present invention will become apparent to those skilled in the art from the detailed description thereof taken in view of the drawings.

DETAILED DESCRIPTION OF INVENTION

Figure 1:
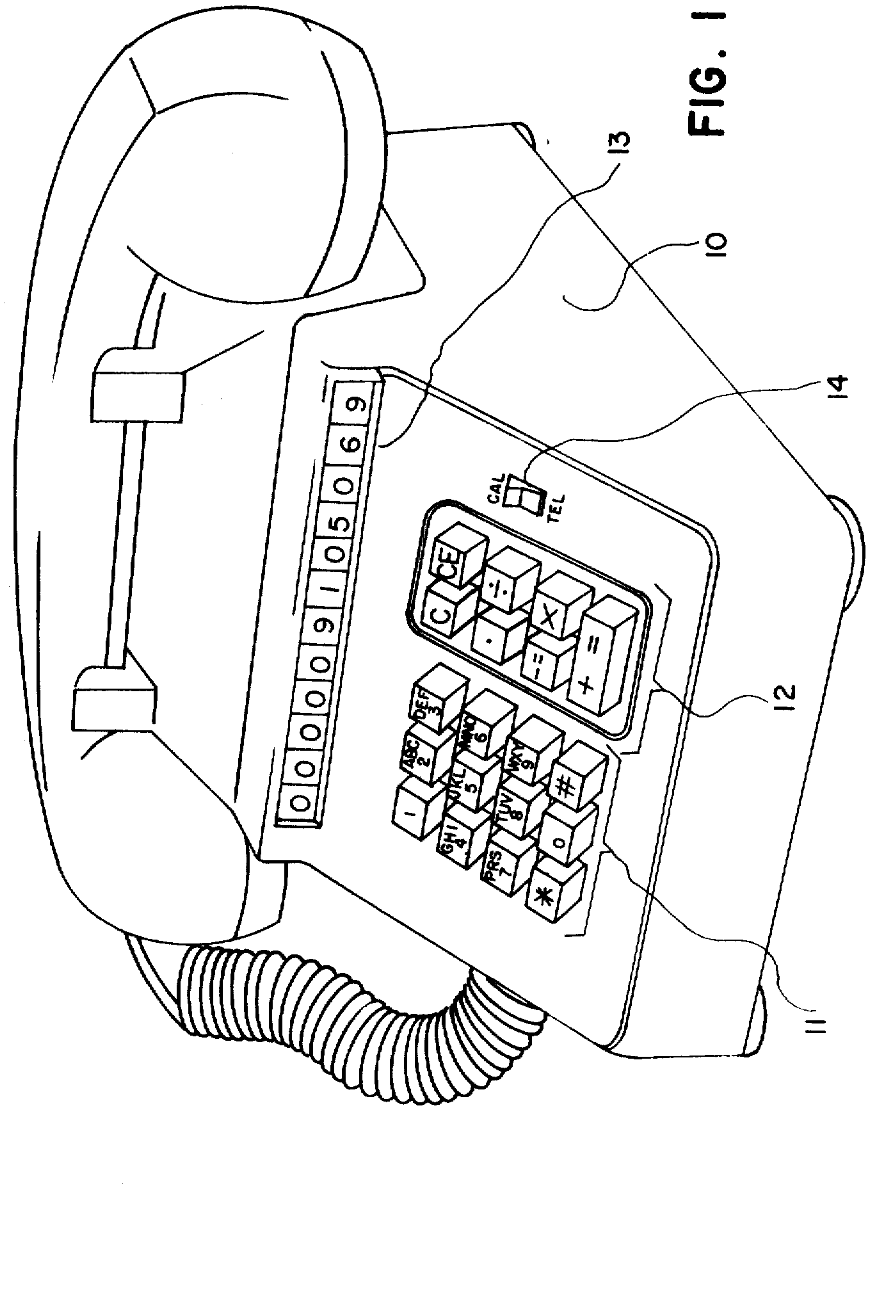
FIG. 1 is a perspective view of a telephone keyboard and modifications thereof suitable for use with a calculator.

A telephone housing modified in accordance with the present invention is shown in FIG. 1 of the drawing. The telephone 10 employs the ordinary and well known configuration of touch tone buttons 11 which include the numerals zero through nine and the special function buttons on the left and right of the operator or zero button. The telephone housing has been modified to include an array of calculator function buttons 12 disposed to the right of the array of normal touch tone buttons 11. The calculator function buttons operate to carry on the calculating functions as are well known in the art.

The telephone housing has been further modified to provide an illuminated numeric display 13. Such a display contains positions for 12 digits and is of the type commonly utilized in calculators. The housing further includes a two position switch 14. The switch is designed to switch the use of the touch tone buttons 11 between their normal use for dialing and as the input to a calculator as hereinafter described in respect to FIGS. 2 and 3.

Figure 2:
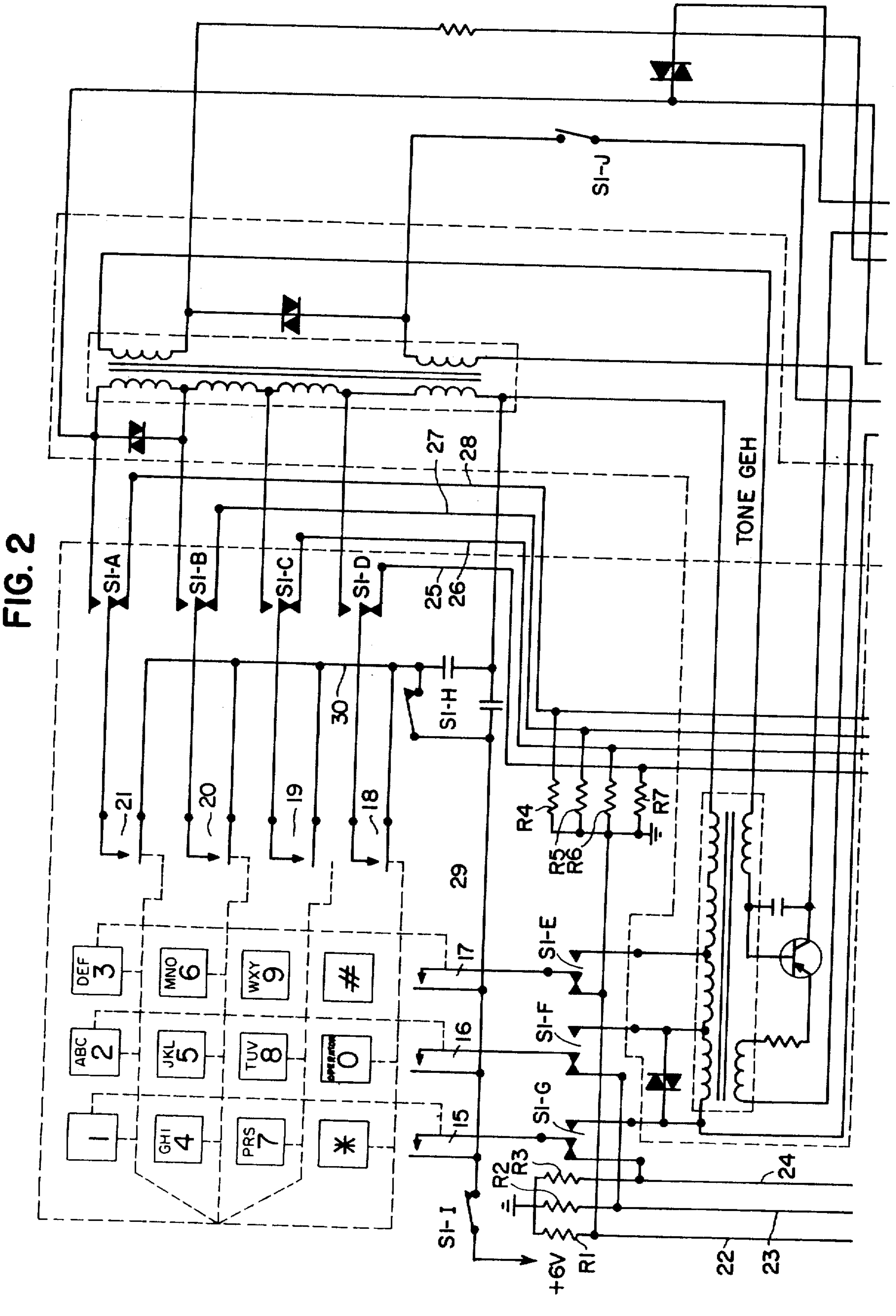
FIGS. 2 and 3 are a schematic diagram of the switching means and decoding means employed in the present invention in respect to common telephone circuitry.
Figure 3:
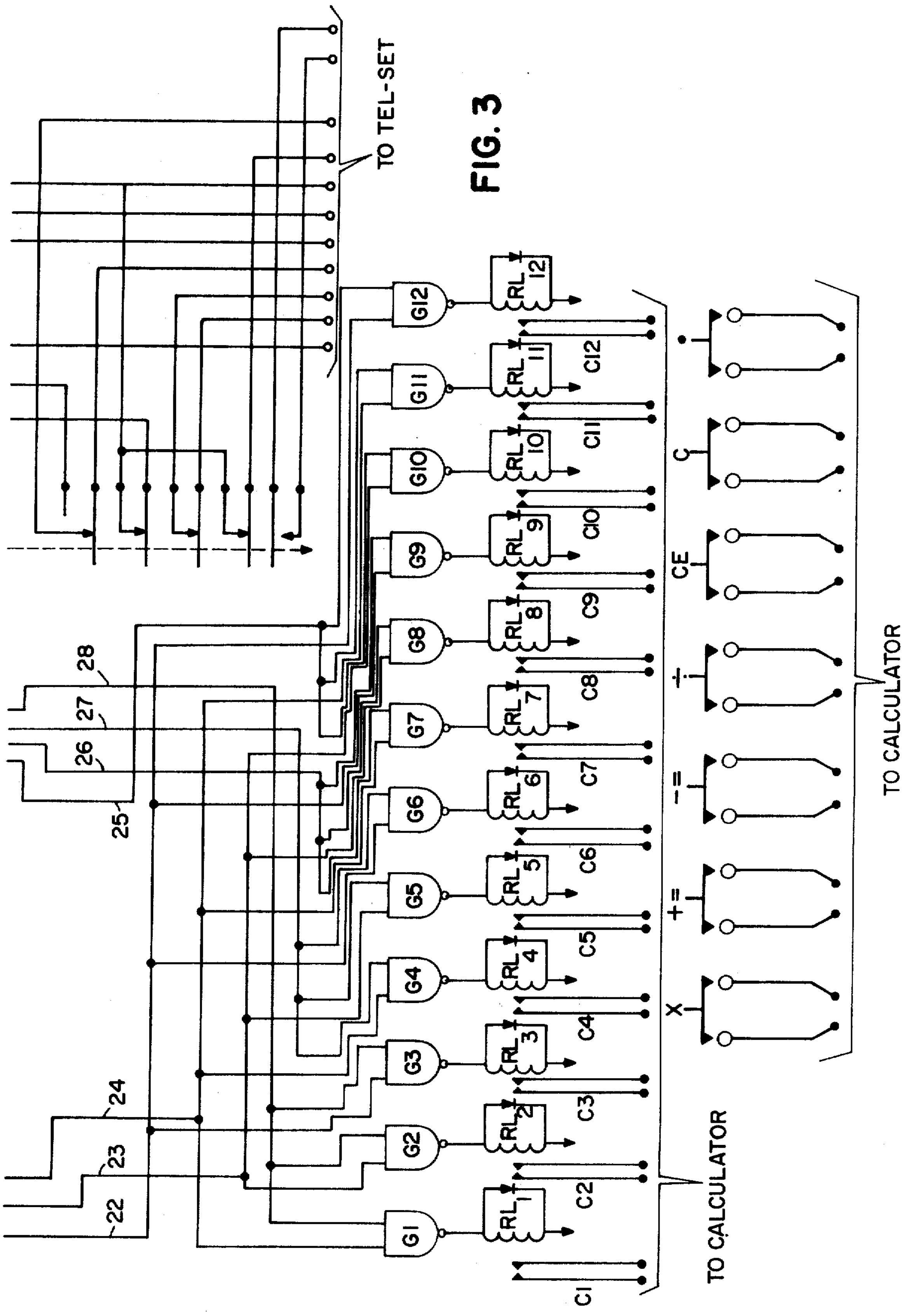

Referring now to FIGS. 2 and 3, there is shown the circuitry utilized in a conventional touch tone telephone in combination with the switching and decoding circuitry of the present invention which provides the dual function of the touch tone keyboard. The touch tone keyboard of a conventional telephone presents an array of three buttons across and four vertically. The buttons are mechanically interconnected to seven contacts numbers 15–21 in such a manner that depression of any one of the buttons will close two contacts, one associated with the vertical array and one associated with the horizontal array numbers 18–21. The resultant two outputs, depending upon the number depressed, are applied as two separate inputs to a tone generator enclosed within broken lines of FIG. 2. The tone generator creates a dual tone pair indicative of the number depressed.

The dual tone so generated is transmitted from the telephone across the telephone line to effect the dialing function at a central office. The tone generating circuitry shown in FIG. 2 as well as related circuitry for disconnecting the earpiece of the telephone during dialing is conventional and well known circuitry and it is not believed necessary to the description of the present invention to further describe the details or operation thereof.

In accordance with the present invention, the seven outputs from the touch tone keyboard passing through switches 15–21 are applied to plurality of double pole double throw switches S1-A through S1-G. The switches are shown in FIG. 2 in their special function position for use of the keyboard as an input to a calculator. When switch S1 is thrown to the position shown in FIG. 2, the seven separate outputs from the keyboard are disengaged from the tone generators and applied as inputs to seven lines 22–28 shown in FIGS. 2 and 3.

Switch S1 also includes two contacts S1-I and S1-H. Closure of these contacts occurs whenever switch S1 is placed in the calculator position as shown in FIG. 1. When these contacts are closed, a 6 volt source is applied upon lines 29 and 30 leading to one side of the touch tone contacts 15–21.

The seven output lines 22–28 from switch S1 are innerconnected into a decoding matrix which utilizes twelve dual input nand gates G1 through G12. Upon depression of any one to the twelve buttons in the telephone keyboard, a circuit will be completed which will apply the 6 volt potential across one of lines 22–24 in the vertical array and also an output on one of lines 25–28 in the horizontal array of the touch tone buttons. The particular pair of lines which are energized will depend upon the particular button in the touch tone keyboard which is depressed. The signals appearing upon the pair of lines representative of the button depressed will be decoded in the decoding matrix such that a high or potential will be applied to both gates of a particular nand gate representative of the number depressed. That particular nand gate, upon the appearance of two highs, will swing to a low output. The remainder of the nand gates will remain with high outputs.

A plurality of resistors R1-R7 are connected across each of the respective lines 22–28 to ground to maintain the inputs to the nand gates at ground potential until a button is depressed. In this manner, it is assured that the output of the nand gates will be maintained low until a button in the keyboard is depressed.

Each of nand gates G1–G12 has associated therewith a relay RL-1 through RL-12 respectively. These relays are driven by a 6 volt source. Whenever the particular nand gate associated with a particular button goes low on its output, the 6 volt source is effected through the relay to energize the relay and pull in the associated contact C1–C12 associated with the respective relays.

Each of the respective contacts C1–C12 are wired into the electronic calculator disposed within the housing as the keyboard input to the calculator. Each of the respective function buttons which are positioned in the housing of the telephone are, likewise, wired into the electronic calculator in a conventional manner. These are then shown in FIG. 3 set apart for completeness of the disclosure.

From the foregoing it will be appreciated that the telephone may be utilized in an ordinary manner for dialing. Whenever it is desired that the telephone be utilized as a calculator, switch 14 is depressed and contacts S1-A through S1-H switched to their position shown in FIG. 2 whereupon the keyboard of the telephone will be directly connected as an input to the calculator housed within the telephone. The arrangement of switches shown in FIGS. 2 and 3 is such that the calculator will function while the telephone is not in use as well as while the telephone is being used for conversation. Inasmuch as switch S1 disengages the telephone keyboard from the tone generators, utilization of the calculator while carrying on a conversation over the phone will not disrupt the telephone conversation.

The voltages needed to operate the electronic calculator and associated switching circuitry may be created by use of a plug in transformer similar to the type used for lighting the dial of a princess telephone. The AC voltage is then rectified, filtered and regulated to 6 volts DC by use of a zener diode in a conventional and well known manner.

Thus it will be appreciated that the improvements to conventional telephones of the present invention provide maximum utilization of components of the telephone to provide a space saving device and dual function and use of the components of a conventional telephone.

The foregoing description of the present invention has been made in respect to particular embodiments shown thereof in the drawings. Other embodiments and modifications thereof will now become apparent to those skilled in the art. It is to be understood that no limitation as to the scope of the invention was intended by the description thereof in respect to particular embodiments shown in the drawings but is to be interpreted in view of the appended claims.

I claim:

1. In a communications device such as a telephone including a housing, input-output lines, a numeric keyboard providing seven separate outputs as inputs to a dual tone generator to create 12 separate tone pairs, the improvement permitting dual use of the telephone keyboard for tone dialing and as an input to a calculator comprising:

an electronic calculator positioned within the telephone housing and including numeric inputs from zero to nine plus function inputs;

switch means disengaging the seven outputs of the keyboard from the tone generators and providing the seven separate outputs as inputs to a decoding matrix; and a decoding matrix for decoding the seven outputs into twelve outputs representative of the numeric keyboard designations and applying the decoded outputs as inputs to the calculator.

2. Communications device of claim 1 wherein the decoding matrix includes 12 separate dual input nand gates.

* * * * *